United States Patent
Nishioka

[11] 4,366,675
[45] Jan. 4, 1983

[54] GEOTHERMAL TURBINE INSTALLATION

[75] Inventor: Ryozo Nishioka, Kawasaki, Japan

[73] Assignee: Fuji Electric Co., Ltd., Kanagawa, Japan

[21] Appl. No.: 93,471

[22] Filed: Nov. 13, 1979

[30] Foreign Application Priority Data

Nov. 16, 1978 [JP] Japan .................................. 53-141386
Feb. 15, 1979 [JP] Japan .................................. 54-16405

[51] Int. Cl.³ .............................................. F28B 7/00
[52] U.S. Cl. ................................... 60/693; 60/641.3
[58] Field of Search ................... 60/690, 693, 641.2, 60/641.3, 641.5

[56] References Cited

U.S. PATENT DOCUMENTS

| | | | |
|---|---|---|---|
| 1,143,349 | 6/1915 | Bancel | 60/693 X |
| 3,862,545 | 1/1975 | Ellis et al. | 60/641 F |
| 3,953,972 | 5/1976 | Awerbuch et al. | 60/641.5 |
| 4,156,349 | 5/1979 | Silvestri, Jr. | 60/692 |

*Primary Examiner*—Allen M. Ostrager
*Assistant Examiner*—Stephen F. Husar
*Attorney, Agent, or Firm*—Sughrue, Mion, Zinn, Macpeak & Seas

[57] ABSTRACT

A geothermal turbine intallation in which high-pressure steam is separated from geothermal steam, which is a mixture of steam and water, with the high pressure steam connected to a high pressure turbine. Low pressure steam produced by flashing the hot water component of the geothermal steam is introduced to a low pressure turbine which is constructed and operates independently of the high pressure turbine. The discharge steam from the high pressure turbine is introduced to a steam condenser operating at a low vacuum while discharge steam from the low pressure turbine is introduced into a steam condenser operating at a high vacuum. The cooling water system of the high and low pressure condensers are connected in series with one another. A maximum power increase is obtained if the flow rates of the high and low pressure steams at the extraction ports of the high and low pressure turbines are made substantially equal to one another.

7 Claims, 8 Drawing Figures

GEOTHERMAL TURBINE INSTALLATION

BACKGROUND OF THE INVENTION

The present invention relates to a "multiple-stage flash-type" geothermal turbine installation in which power is derived from both high pressure steam which is separated from geothermal steam, which is a mixture of water and steam, and low pressure steam, which is obtained by flashing the remaining hot water.

A geothermal turbine installation of this general prior art type is shown in FIG. 1. The installation includes a geothermal well 1, a pipe 2 for geothermal steam which is a mixture of steam and water, a steam separator 3, a high pressure steam pipe 4 and a hot water pipe 5 extending from the steam separator, a hot water flash tank 6, a low pressure steam pipe 7 extending from the flash tank 6, a drain pipe 8 from the flash tank 6 which may in some installations be connected to a flash tank in the following stage, and a mixed-pressure turbine 9 in which a high pressure turbine section HT and a low pressure turbine section NT are formed as a single unit. The high pressure steam inlet 10 of the mixed-pressure turbine 9 is connected to the high pressure steam pipe 4 while the low pressure steam inlet 11 is connected to the low pressure steam pipe 7. The installation further includes high pressure steam inlet valves 12 and 13, a steam condenser 14 for condensing discharge steam from the mixed-pressure turbine 9, a condensation pipe 15 and a condensation pump 16 of the steam condenser 14 which as shown is formed as a jet condenser, a cooling water pipe 17 for supplying cooling water to the steam condenser 14, the gas extraction pipe 18 of the steam condenser 14, a steam ejector-type gas extractor or a mechanical gas extractor 19 such as a water ring pump, and a load 20 such as a generator which is coupled to the mixed-pressure turbine 9.

The operation of the geothermal turbine installation thus constructed will be described. The geothermal steam or the mixture of steam and water which is pumped up from the geothermal well 1 is separated into high pressure steam and hot water by the steam separator 3. The high pressure steam is introduced through the pipe 4 into the high pressure turbine section HT of the mixed-pressure turbine 9. On the other hand, the hot water is flashed by the flash tank 6 as a result of which low pressure flash steam is produced. The low pressure flash steam is introduced through the pipe 7 into the low pressure turbine section HT of the mixed-pressure turbine 9. The two types of steam are expanded in the mixed-pressure turbine 9 where they perform work and are thereafter introduced into the steam condenser 14 where they are condensed and then discharged by the condensation pump 16.

The above-described mixed-pressure type geothermal turbine is disadvantageous in the following points. The high pressure steam from the steam separator 3 is substantially saturated steam as is generally true of geothermal steam so that the humidity of steam at the turbine outlet is high. Also, high pressure steam contains a large quantity of non-condensate gas. Accordingly, because of the inevitable wear of the turbine blades in the low pressure stage and the practical capacity of the gas extractor 19, it is impossible to maintain the vacuum of the steam condenser 14 at a high level. On the other hand, the flash steam from the hot water is higher in entropy than the high pressure steam from the steam separator. Therefore, the humidity of the flash steam itself is low at the turbine outlet and the content of non-condensate gas is quite small. However, since the vacuum of the steam condenser 14 is set low depending only on the conditions of the high pressure steam, the low pressure steam is discarded wastefully with very little conversion into useful energy.

In view of the foregoing, provided in accordance with the invention is a geothermal turbine installation in which high pressure steam, which is separated from geothermal steam which is a mixture of steam and water, and low pressure steam, which is obtained by flashing the remaining hot water, are introduced into a high pressure turbine and a low pressure turbine which are formed as separate units. Discharged steam from the high pressure turbine is introduced into a steam condenser at a low vacuum, discharged steam from the low pressure turbine is introduced into a steam condenser at a high vacuum, and a water cooling system of the steam condenser of the low pressure turbine and a water cooling system of the steam condenser of the high pressure turbine are connected in series with each other. Preferably, means is provided for controlling or maintaining the ratio of the steam discharged from the high pressure turbine to the flow rate of the steam discharged from the low pressure turbine to an approximate value of 1:1.

Still further, the invention may be practiced by a geothermal turbine installation including a high pressure turbine section and a low pressure turbine section, means for separating geothermal steam into high pressure steam and hot water, means for coupling the steam from the separator to the high pressure section of the turbine, means for flashing the hot water into steam, means for coupling the steam from the flashing means to the low pressure turbine section, means for coupling a portion of high pressure steam from the high pressure turbine section after the high pressure steam has been expanded in a portion of the high pressure section to the low pressure turbine section, a low vacuum steam condenser coupled to receive steam discharged from the high pressure turbine section, and a high vacuum steam condenser coupled to receive steam discharged from the low pressure turbine section. There is preferably provided means for maintaining the ratio of the flow rate of steam discharged from the high pressure section to the flow rate of steam discharged from the low pressure section to an approximate value of 1:1.

DESCRIPTION OF THE PREFERRED EMBODIMENTS

Figure 1:
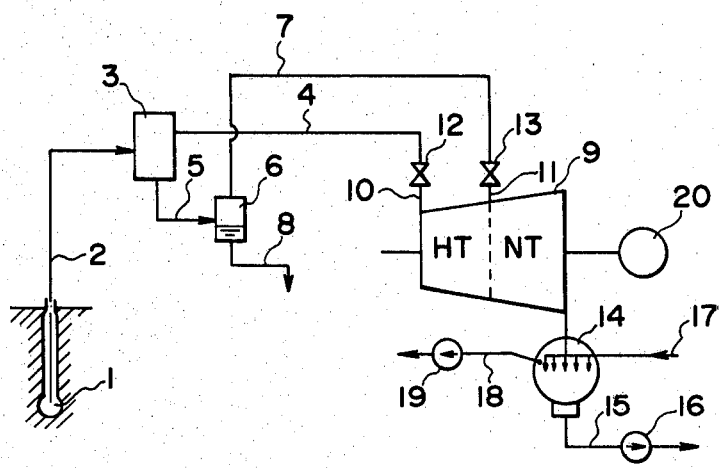
FIG. 1 is a schematic diagram of a geothermal turbine installation of the prior art.

The invention will be described with reference to the embodiment shown in FIG. 2 in which those components which have been described with reference to FIG. 1 have been similarly designated.

In a high pressure turbine 30 supplied with high pressure steam and a low pressure turbine 40 supplied with low pressure steam, according to the invention at least their steam chambers are independent from each other. Furthermore, according to the invention, the high pressure turbine 30 is connected to a steam condenser 31 at a low vacuum while the low pressure turbine 30 is connected to a steam condenser 41 at a high vacuum. In this case, each of the steam condensers 31 and 41 is formed as a jet condenser. The steam condensers 31 and 41 are provided with condensation pipes 32 and 42, condensation pumps 33 and 43, and cooling water pipes 34 and 44, respectively. In accordance with one aspect of the invention, these elements are connected in series with one another. The steam condensers 31 and 41 are further provided with gas extracting pipes 35 and 45 and gas extractors 36 and 46, respectively.

In a geothermal turbine installation constructed as described above according to the invention, the high pressure steam from the steam separator 3 is fed through the high pressure steam pipe 4, the inlet valve 12 and the inlet 10 into the high pressure turbine 30 where it is expanded to perform work. Thereafter the steam is introduced into the steam condenser 31 where it condenses into water. In this case, the high pressure steam from the steam separator 3 is primarily saturated vapor including a large quantity of non-condensate gas. Accordingly, in order to prevent erosion of the blades in the low pressure stage of the high pressure turbine 30 and to maintain a practical and economical capacity of the gas extractor 36, the degree of vacuum of the steam condenser 31 is set low for instance 0.11 ata or lower as in the case of the conventional steam condenser 14 in FIG. 1.

On the other hand, the flash steam from the hot water flash tank 6 is introduced through the low pressure steam pipe 7, the inlet valve 13 and the inlet 11 into the low pressure turbine 40 where it expands to perform work. Thereafter, the steam is introduced into the steam condenser 41 at a high vacuum where it condenses into water. In this case, the flash steam from the hot water flash tank 6 has a high entropy and includes only a small amount of non-condensate gas. Accordingly, the degree of vacuum of the steam condenser 41 is set higher, for instance 0.08 ata, than that of the steam condenser 31 of the high pressure turbine 30 in correspondence with the conditions of the flash steam.

In this case, the cooling water pipe 44 of the steam condenser 41 at a high vacuum and the cooling water pipe 34 of the steam condenser 31 at a low vacuum are connected in series with each other. The cooling water is thus fed through the pipe 44 into the steam condenser 41 of the low pressure turbine 40 where it is heated. The water thus heated and the condensate from the discharged steam from the low pressure turbine 40 are subjected to a pressure boost and are supplied through the pipes 42 and 34 to the steam condenser 31 of the high pressure turbine 30. Thus, with the flow rate of the cooling water substantially equal to that of the conventional geothermal turbine installation shown in FIG. 1, a high vacuum is satisfactorily provided in the steam condenser 41 of the low pressure turbine 40, while low vacuum is satisfactorily provided in the steam condenser 31 of the high pressure turbine 30.

The high pressure turbine 30 and the low pressure turbine 40 can be constructed as a double flow-type turbine using a common casing. Furthermore, the steam condensers 31 and 41 can be formed as a single unit as a so-called "multiple-stage steam condenser". As the content of non-condensate gas in the discharge steam of the low pressure turbine 30 is very low, the power required for operating the gas extractor 46 can be very low. Especially, if the outlet port of the gas extractor 46 is connected to the suction port of the gas extractor 36 of the steam condenser 31 of the high pressure turbine 30, then the gas extractor 46 can be operated with a small amount of power because the pressure of the gas extractor 46 is boosted to the internal pressure of the steam condenser 31 of the high pressure turbine 30. Any increase in the cost of equipment can be disregarded because as a practical matter such cost is substantially offset by the improvement of the energy conversion efficiency of low pressure steam.

As is clear from the above description, in a geothermal turbine installation according to the invention, with minimum expenditures for equipment and operation, the high pressure steam from a geothermal well and the flashed steam from the hot water are introduced into turbines having separate steam chambers and the degree of vacuum of the steam condenser of the low pressure turbine supplied with flash steam can be made higher than the degree of vacuum of the steam condenser of the high pressure turbine supplied with high pressure steam whereby the energy conversion efficiency of an overall plant including such a geothermal turbine installation can be increased and the output power can be increased by 4 to 5%.

Figure 2:
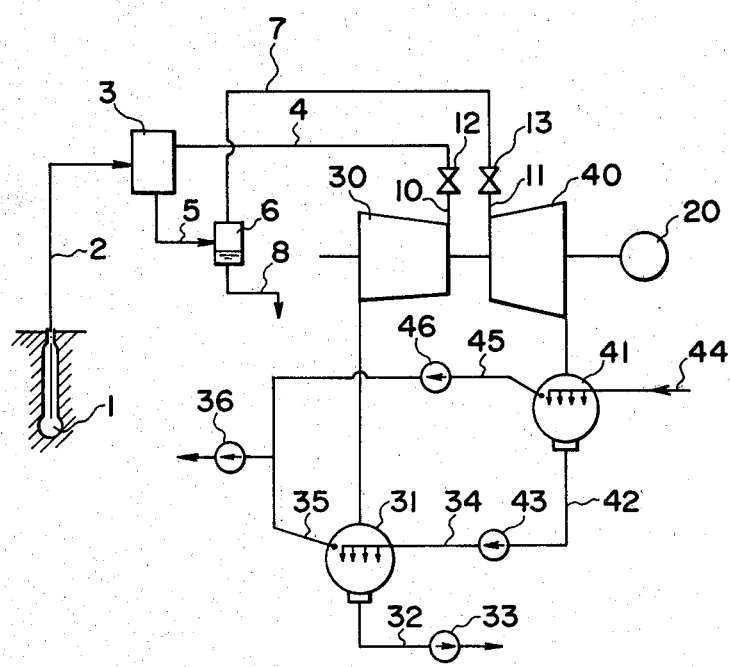
FIG. 2 is a schematic diagram of a geothermal turbine installation according to one embodiment of the invention.

In the embodiment shown in FIG. 2, the steam and water mixture, namely the geothermal steam, is subjected to separation at the steam separator. However, in the case of a geothermal well from which a large quantity of hot water is discharged, instead of a steam separator, a flash separator can be provided. The steam condensers 31 and 41 may be surface contact-type steam condensers instead of direct contact-type jet condensers. Furthermore, the condensation (pressure increase) pump 43 connected to the condensation pipe 42 of the low pressure turbine 40 can be omitted as the case may be.

Figure 3:
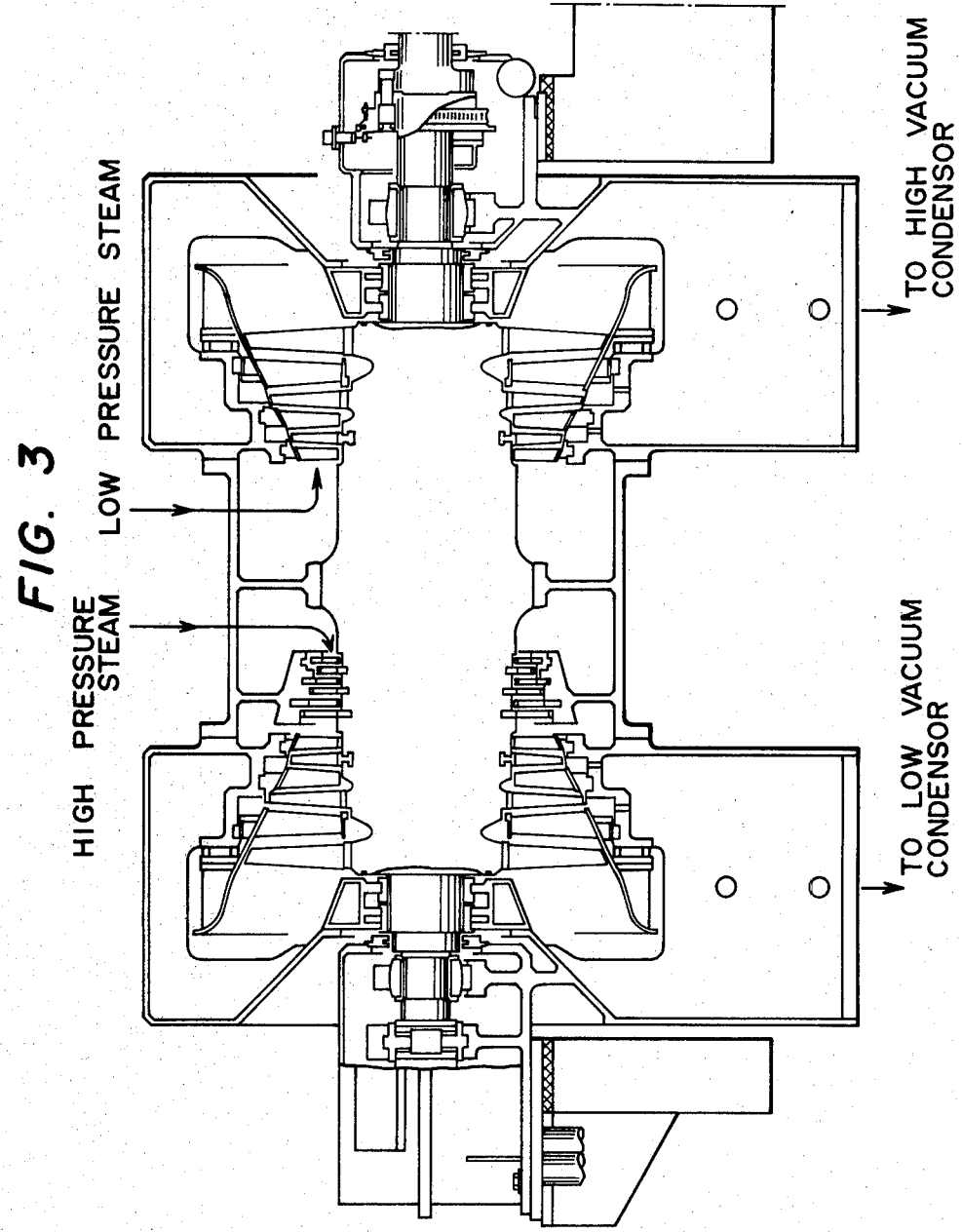
FIG. 3 is a cross-sectional view of a turbine used in the embodiment of FIG. 2.

FIG. 3 shows an example of a turbine according to the invention. In this turbine, the high pressure steam performs work while passing through the left turbine expansion section and is introduced through the left discharge port into the steam condenser on the low vacuum side. The flashed low pressure steam performs work while passing through the right turbine expansion section and is introduced through the right deschage port into the steam condenser on the high vacuum side. This example is of a one-cylinder double flow exhaust type. However, it is obvious that the turbine can as well be a multi-cylinder multi-flow exhaust type.

Figure 4:
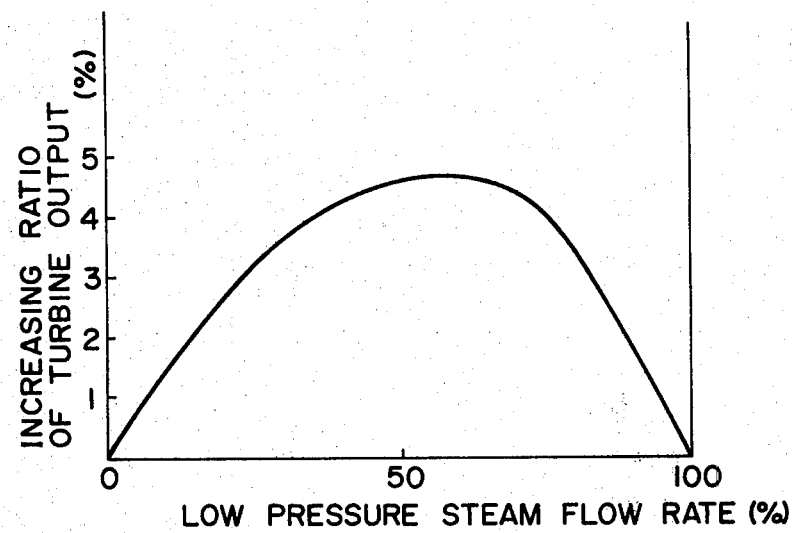
FIG. 4 is a graph showing the percentage of increase in output power as a function of the ratio between high and low pressure steam flow rates.

This embodiment of multiple-stage pressure steam condensers produces excellent results as described above. However, the extent of the improvement obtained thereby is affected by the ratio of flow rates of the high pressure steam and the low pressure steam. FIG. 4 is a graphical representation showing the effects of varying the ratio of flow rate. The vertical axis indicates the incremental increase in percent(%) of a turbine output with multiple-stage pressure steam condenser employed as described above with respect to a turbine output obtained when the discharged high pressure steam and low pressure steam are introduced into a single steam condenser. The horizontal axis indicates a low pressure steam flow rate ratio, specifically, the percentage of a value which is obtained from the following formula:

$$\frac{G2}{G1+G2},$$

where G1 is the flow rate of high pressure steam and G2 is the flow rate of low pressure steam.

As is apparent from FIG. 4, the increase of the output value is maximum when the ratio of flow rate between the high pressure steam and the low pressure steam is about 1:1. As the ratio becomes larger or smaller than 1:1, the favorable effects of using the multiple-stage pressure steam condenser decrease. In actual geothermal steam, the quantity of flashed low pressure steam can be less than that of high pressure steam so that employment of a multiple-stage steam condenser is not satisfactorily beneficial.

In view of the foregoing, the invention is further intended to provide a geothermal turbine installation which can produce its maximum beneficial effect even if the flow rate of high pressure steam is different from that of low pressure steam.

Figure 5:
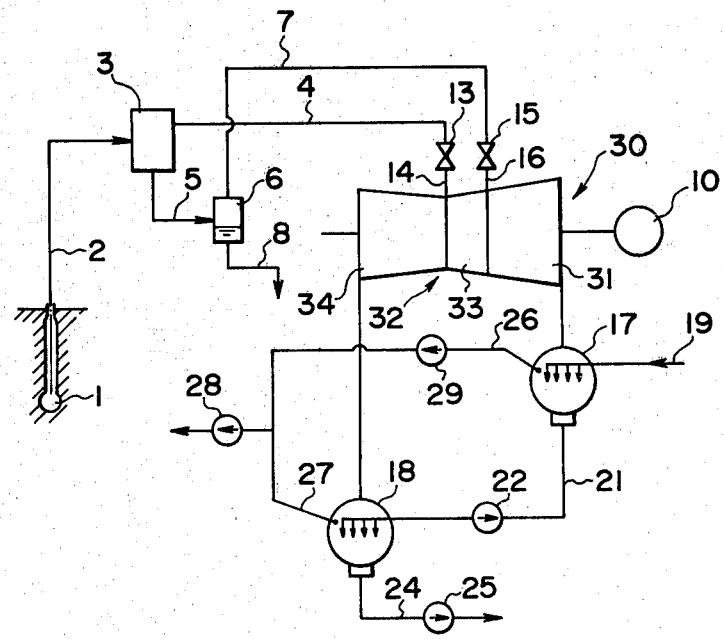
FIG. 5 is a schematic diagram of a second embodiment of a geothermal turbine installation of the invention.
Figure 7:
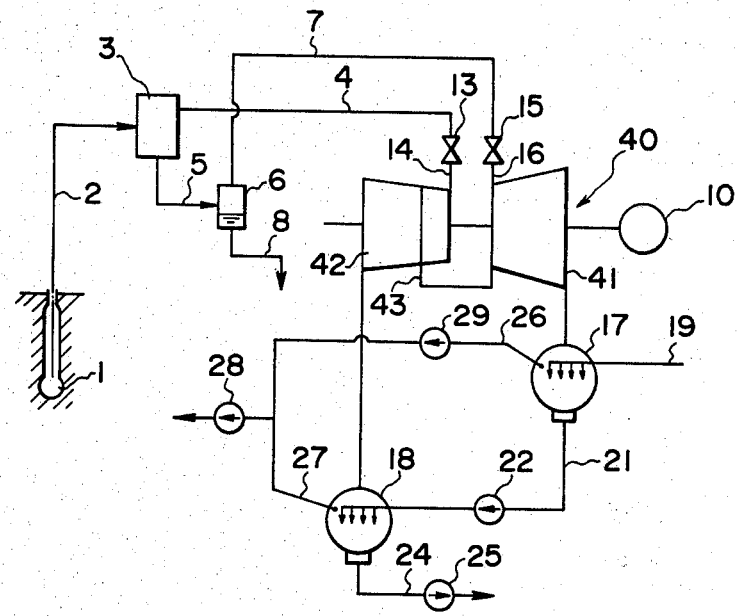
FIG. 7 is a schematic diagram of a third embodiment of a geothermal turbine installation of the invention.

Second and third embodiments of the invention will next be described in conjunction with FIGS. 5 and 7. In FIGS. 5 and 7, these components which have been described with reference to FIG. 1 are similarly numbered and a detailed description of them will be omitted.

FIG. 5 shows a second embodiment of the invention in which a turbine 50 has a low pressure turbine section 31 and a high pressure turbine section 32. The high pressure turbine section is divided into two parts, a first part 33 and a second part 34. The first part 33 connects the low pressure turbine section 31 with the steam chamber forming an ordinary mixed-pressure turbine. The turbine shaft of the second part 34 is common with that of the first part. However, the steam chamber thereof is independent of that of the first part. Unlike the embodiment shown in FIG. 2, the inlet 14 of high pressure steam is provided between the first and second parts of the high pressure turbine where the high pressure steam is distributed so that a part of the high pressure steam is supplied to the first part 33 and the remaining steam is supplied to the second part 34. The high pressure steam expanded in the first part is mixed with low pressure steam supplied from a low pressure steam inlet 16 and the steam mixture is continuously expanded in the low pressure turbine section. The discharged steam is introduced into a steam condenser 17 of high vacuum. On the other hand, the steam supplied to the second part 34 of the high pressure turbine in expanded only in the second part and the discharged steam is introduced into a steam conductor 18 of low vacuum. The distribution of high pressure steam at the inlet 14 is determined so that, according to the output increment characteristic curve shown in FIG. 4, the ratio of the quantity of discharged steam from the low pressure turbine section 31 to the quantity of discharged steam from the second part 34 of the high pressure turbine section approaches 1:1 as nearly as possible. This may be achieved by employing a method in which the distribution of high pressure steam is effected as calculated in advance in compliance with the ratio of flow rate between the high pressure steam and the low steam pressure in the geothermal steam which is supplied from a particular steam well. Alternatively, an arrangement may be provided so that the distribution can be controlled as desired so as to be applicable to any steam well.

Figure 6:
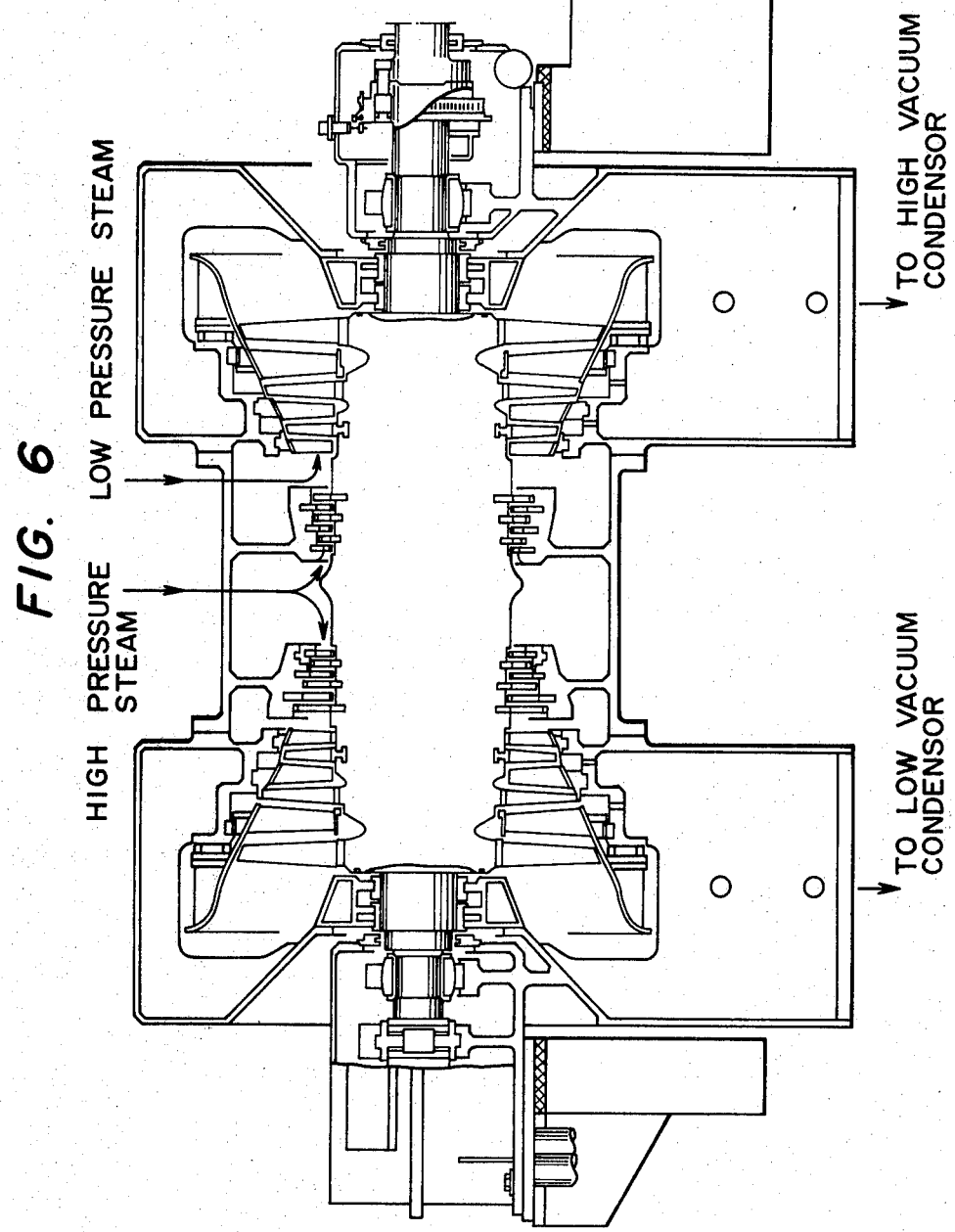
FIG. 6 is a cross-sectional view of a turbine used with the embodiment of FIG. 5.

FIG. 6 shows an example of the turbine constructed according to the above-described embodiment of the invention. A larger part of the high pressure steam performs work while passing through the left turbine expansion section and is introduced through the left turbine discharge port into the steam condenser on the low vacuum side. The remaining part of the high pressure steam performs work while passing through the left high pressure turbine expansion section then is mixed with low pressure steam and is introduced through the right turbine discharge port into the steam condenser on the high vacuum side. This example is of a turbine of the one-cylinder and double flow exhaust type. However, it may readily be modified to one of the multicylinder multi-flow exhaust type.

The third embodiment of the invention is as shown in FIG. 7. Similar to the embodiment shown in FIG. 2, a turbine 40 has a low pressure turbine section 41 and a high pressure turbine section 42 whose steam chambers are independent of each other. However, in this embodiment a part of the high pressure turbine section is connected through a communication path 43 to the low pressure turbine 41. A part of the high pressure steam expanded in the high pressure turbine section 42 is extracted and is supplied together with low pressure steam from an inlet 16 to the low pressure turbine section 41. The quantity of steam extracted may be a predetermined constant quantity or it may be varied by means of a valve provided in the communication path 43. At any rate, it is preferable that the ratio of the quantity of discharged steam from the high pressure turbine section 41 to the quantity of discharged steam from the low pressure turbine section 41 be as close to 1:1 as possible.

Figure 8:
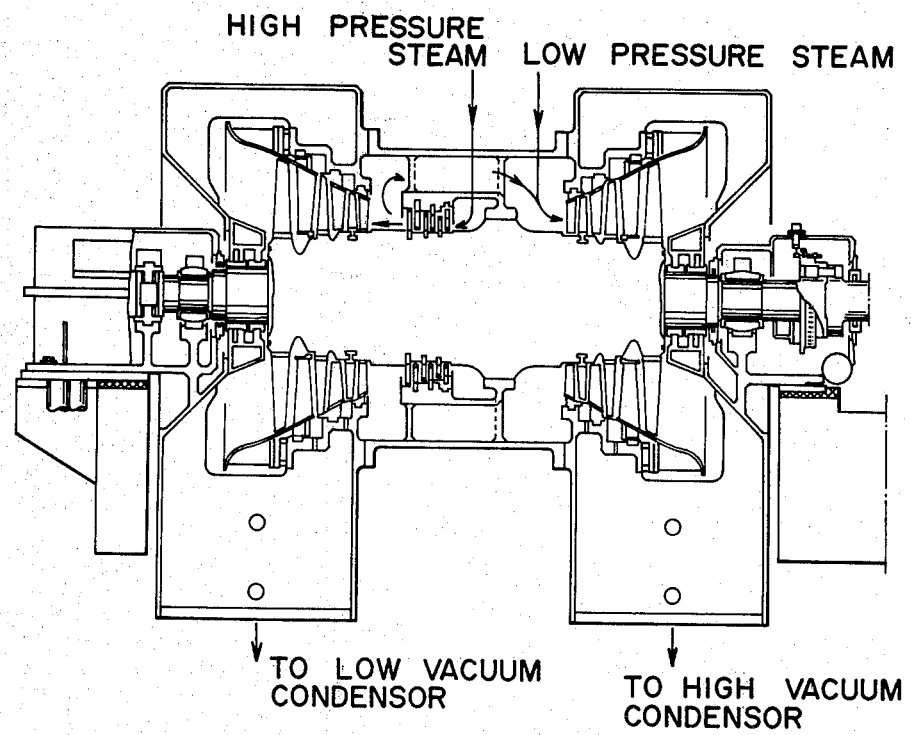
FIG. 8 is a cross-sectional view of a turbine used with the embodiment of FIG. 7.

FIG. 8 is a cross-sectional view showing an example of the turbine according to the third embodiment of the invention. First, the high pressure steam performs work while passing through the high pressure expansion section. Thereafter, a larger part of the high pressure steam performs work while passing through the left expansion section and is introduced through the left discharge port into the steam condenser on the low vacuum side. The flow direction of the remaining part of the high pressure steam is changed to the right and that part is introduced through the turbine steam chamber to the right turbine expansion section where it is mixed with low pressure steam. The steam mixture performs work while passing through the right expansion section and is introduced through the right discharge port to the steam condenser on the high vacuum side. This example of a turbine is one of a single-cylinder and double flow exhaust type. However, it may be modified if desired to be a multicylinder multi-flow exhaust type.

In the second and third embodiments of the invention, a large part of the high pressure steam containing a large quantity of non-condensate gas is condensed into water by the steam condenser 18 (FIGS. 5 and 7) on the low vacuum side and therefore the power required for the gas extractor is not excessive and the above-described difficulty in which high wet is formed by excessively high vacuum is eliminated. Furthermore, the discharged steam from the low pressure turbine section, a large part of which is steam obtained by flashing, is condensed into water by the steam condenser 17 of high vacuum. Therefore, the energy of the low pressure steam can be effectively converted into hynetic energy. In addition, it is possible to let the ratio of the flow rate of discharged steam from the high pressure turbine section to the flow rate of discharged steam from the low pressure turbine section approach 1:1 and therefore the positive increment in output power increment can be fully realized.

What is claimed is:

1. A geothermal turbine installation comprising:
a high pressure turbine and a low pressure turbine formed independently of one another;
means for separating geothermal steam into high pressure steam and hot water;
means for coupling said high pressure steam from said separating means to said high pressure turbine;
means for flashing said hot water into steam at a lower pressure than said high pressure steam;
means for coupling said low pressure steam from said flashing means to said low pressure turbine;
a low vacuum steam condenser coupled to receive steam discharged from said high pressure turbine;
a high vacuum steam condenser coupled to receive steam discharged from said low pressure turbine; and
means for connecting a cooling water system of said low pressure turbine in series with and through a cooling water system of said high pressure turbine.

2. The geothermal turbine installation of claim 1 further comprising means for coupling a discharge port of a extractor of said high vacuum condenser to a suction port of a gas extractor of low vacuum condenser.

3. The geothermal turbine installation of either claim 1 or 2 further comprising means for maintaining the ratio of the flow rate of steam discharged from said high pressure turbine to the flow rate of steam discharged from said low pressure turbine to an approximate value of 1:1.

4. A geothermal turbine installation comprising:
a high pressure turbine section and a low pressure turbine section;
means for separating geothermal steam into high pressure steam and hot water;
means for coupling said steam from said separator to said high pressure turbine section;
means for flashing said hot water into steam;
means for coupling said steam from said flashing means to said low pressure turbine section;
means for coupling a portion of high pressure steam from said high pressure section after said high pressure steam has been expanded in a portion of said high pressure turbine section to said low pressure turbine section;
a low vacuum steam condenser coupled to receive steam discharged from said high pressure turbine section; and
a high vacuum steam condenser coupled to receive steam discharged from said low pressure turbine section.

5. The geothermal turbine installation of claim 4 wherein said high pressure turbine section comprises a first part and a second part, said first part communicating said low pressure turbine section with a steam chamber so that a part of said high pressure steam expanded in said first part is thereafter continuously expanded in a low pressure section, said second part communicating said low vacuum condenser, said high pressure steam being distributed between said first and second parts of said high pressure turbine section.

6. The geothermal turbine installation of claim 4 wherein said high pressure turbine section and said low pressure turbine section are formed so that steam chambers thereof are independent of each other and a communication path is provided between said high pressure turbine section and said low pressure turbine section so that a portion of high pressure steam expanded in a part of said high pressure turbine section is extracted and supplied to said low pressure turbine section.

7. The geothermal turbine installation of any of claims 4 to 6 further comprising means for maintaining the ratio of the flow rate of steam discharged from said high pressure section to the flow rate of steam discharged from said low pressure section to an approximate value of 1:1.

* * * * *